(12) United States Patent
Iba et al.

(10) Patent No.: US 8,194,333 B2
(45) Date of Patent: Jun. 5, 2012

(54) IMAGING LENS AND IMAGING DEVICE USING THE SAME

(75) Inventors: Takumi Iba, Kyoto (JP); Masatoshi Yamashita, Osaka (JP); Nami Nagamori, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/864,646

(22) PCT Filed: Jul. 10, 2009

(86) PCT No.: PCT/JP2009/003229
§ 371 (c)(1),
(2), (4) Date: Jul. 26, 2010

(87) PCT Pub. No.: WO2010/026691
PCT Pub. Date: Mar. 11, 2010

(65) Prior Publication Data
US 2010/0309367 A1    Dec. 9, 2010

(30) Foreign Application Priority Data

Sep. 3, 2008  (JP) .................................. 2008-226334

(51) Int. Cl.
*G02B 3/02*    (2006.01)
*G02B 9/34*    (2006.01)
(52) U.S. Cl. ........ 359/773; 359/715; 359/738; 359/739; 359/741; 359/742; 359/771
(58) Field of Classification Search ............... 359/715, 359/737, 738, 739, 741, 742, 771, 773
See application file for complete search history.

(56) References Cited

U.S. PATENT DOCUMENTS

| 2004/0012861 A1 | 1/2004 | Yamaguchi |
| 2007/0008625 A1 | 1/2007 | Park et al. |
| 2008/0043346 A1 | 2/2008 | Sano |
| 2010/0172024 A1* | 7/2010 | Sakagami ..................... 359/738 |

FOREIGN PATENT DOCUMENTS

| JP | 2004-102234 | 4/2004 |
| JP | 2007-17984 | 1/2007 |
| JP | 2008-46526 | 2/2008 |

* cited by examiner

*Primary Examiner* — Evelyn A. Lester
(74) *Attorney, Agent, or Firm* — Hamre, Schumann, Mueller & Larson, P.C.

(57) ABSTRACT

The present invention provides an imaging lens composed of four lenses that can be made compact (downsized, thinned), allows a reduction in cost and is compatible with a high pixel imaging element having a megapixel or more incorporated in a small mobile product such as a mobile phone. The imaging lens 7 includes, in order from the object side to the image surface side: an aperture stop 5; a first lens 1 having positive power; a second lens 2 composed of a meniscus lens having negative power whose lens surface facing the image surface side is concave; a third lens 3 composed of a meniscus lens having positive power whose lens surface facing the image surface side is convex, and a fourth lens 4 having negative power whose lens surfaces are both aspheric and lens surface facing the image surface side is concave in the vicinity of the optical axis. A diffractive optical element is formed on one of the lens surfaces of the first lens 1 or one of the lens surfaces of the second lens 2.

5 Claims, 4 Drawing Sheets

IMAGING LENS AND IMAGING DEVICE USING THE SAME

TECHNICAL FIELD

The present invention relates to an imaging lens suitable for small mobile products, such as a mobile phone, equipped with an imaging device and also to an imaging device using the imaging lens.

BACKGROUND ART

In recent years, small mobile products, such as a mobile phone, equipped with an imaging device (camera module) have become widely popular, and taking pictures instantly with the small mobile products has become a common practice. And as an imaging lens for small imaging devices incorporated in the small mobile products, an imaging lens composed of four lenses compatible with a high pixel imaging element having a megapixel or more has been proposed (see Patent document 1, for example).

The imaging lens described in Patent document 1 includes, in order from the object side to the image surface side, a first lens having positive power whose lens surface facing the object side is convex, a second lens having positive power, a third lens composed of a meniscus lens having negative power whose lens surface facing the object side is concave and a fourth lens composed of a meniscus lens having positive or negative power whose lens surface facing the object side is convex.

PRIOR ART DOCUMENT

Patent Document

Patent document 1: JP 2004-102234 A

SUMMARY OF INVENTION

Problem to be Solved by the Invention

However, with regard to the imaging lens described in Patent document 1, glass is used as the material of the first lens and plastic is used as the material of the second and third lenses. Therefore, the power of the second and third lenses cannot be enhanced sufficiently, so that it is difficult to achieve a reduction in the optical total length (downsized, thinned) to a level required over recent years.

With the foregoing in mind, it is an object of the present invention to provide an imaging lens composed of four lenses that can be made compact (downsized, thinned), allows a reduction in cost and is compatible with a high pixel imaging element having a megapixel or more incorporated in a small mobile product such as a mobile phone and to provide an imaging device using the imaging lens.

Means for Solving Problem

In order to solve the aforementioned problem, the imaging lens of the present invention includes, in order from the object side to the image surface side: a first lens having positive power; a second lens composed of a meniscus lens having negative power whose lens surface facing the image surface side is concave; a third lens composed of a meniscus lens having positive power whose lens surface facing the image surface side is convex, and a fourth lens having negative power whose lens surfaces are both aspheric and lens surface facing the image surface side is concave in the vicinity of the optical axis. A diffractive optical element is formed on one of the lens surfaces of the first lens or one of the lens surfaces of the second lens.

According to the configuration of the imaging lens of the present invention, since a pair of meniscus lenses with lens surfaces facing each other being concave is used for the second and third lenses, it is possible to lower the angles at which rays of light enter the second and third lenses to reduce ray aberration. Further, since the diffractive optical element is formed on one of the lens surfaces of the first lens or one of the lens surfaces of the second lens, chromatic aberration can be corrected favorably. Furthermore, since the lens surfaces of the fourth lens are both aspherical, distortion and field curvature can be corrected favorably.

For these reasons, according to the configuration of the imaging lens of the present invention, it is possible to provide a high-performance imaging lens composed of four lenses that allows favorable correction of a variety of aberrations and is compatible with a high pixel imaging element having a megapixel or more incorporated in a small mobile product such as a mobile phone. Further, according to the configuration of the imaging lens of the present invention, the imaging lens can be made compatible with a high pixel imaging element having a megapixel or more regardless of the material of each lens. Thus, it is possible to achieve a reduction in cost by using plastic as the lens material.

In the configuration of the imaging lens of the present invention, the first lens is preferably a biconvex lens. According to this preferred example, positive power can be distributed onto each lens surface. Thus, it is possible to provide an imaging lens that causes less aberration and is easy to downsize.

Further, in the configuration of the imaging lens of the present invention, when f denotes a focal length of an entire optical system, f1 denotes a focal length of the first lens, f2 denotes a focal length of the second lens, f3 denotes a focal length of the third lens, $\phi_{DOE}$ denotes power of the diffractive optical element and TL denotes a total length of the optical system (optical total length), conditional expressions (1) to (5) preferably are satisfied:

$$0.8 < f1/f < 1.1 \tag{1}$$

$$-2.0 < f2/f < -1.8 \tag{2}$$

$$0.8 < f3/f < 1.2 \tag{3}$$

$$0 < f \cdot \phi_{DOE} \tag{4}$$

$$TL/f < 1.3 \tag{5}$$

The conditional expression (1) relates to a balance of power between the first lens and the entire optical system. When f1/f becomes 0.8 or less or 1.1 or more, it is difficult to correct coma aberration, spherical aberration and astigmatism favorably while keeping the optical total length small.

The conditional expression (2) relates to a balance of power between the second lens and the entire optical system. When f2/f becomes −2.0 or less or −1.8 or more, it is difficult to correct coma aberration, spherical aberration and astigmatism favorably while keeping the optical total length small.

The conditional expression (3) relates to a balance of power between the third lens and the entire optical system. When f3/f becomes 0.8 or less or 1.2 or more, it is difficult to correct coma aberration, spherical aberration and astigmatism favorably while keeping the optical total length small.

The conditional expression (4) relates to the power of the diffractive optical element formed on one of the lens surfaces of the first lens or one of the lens surfaces of the second lens. When f·φ$_{DOE}$ becomes 0 or less, it is difficult to correct chromatic aberration favorably while keeping the optical total length small.

The conditional expression (5) is an expression for balancing the total optical length and aberrations.

Further, in the configuration of the imaging lens of the present invention, when v1 denotes the Abbe number of the first lens, the first lens preferably is composed of a glass lens that satisfies a conditional expression (6):

$$v1 > 60 \tag{6}$$

In this way, by using a glass lens for the first lens having large power, it is possible to minimize deterioration in performance and a focal shift resulting from a change in temperature. Further, by satisfying the conditional expression (6), it is possible to correct aberrations favorably.

Further, in the configuration of the imaging lens of the present invention, the lens on which the diffractive optical element is formed and the third and fourth lenses are preferably all plastic lenses.

Further, in the configuration of the imaging lens of the present invention, the first to fourth lenses are all plastic lenses.

According to these preferred examples, molding of the lenses, including providing the lenses with an aspherical shape and the diffractive optical element, can be carried out readily in addition to gaining a material cost advantage, and by extension a production cost advantage. Even when a glass lens is used for the first lens as described above, it is possible to achieve a reduction in cost by utilizing plastic lenses for the second to fourth lenses.

Further, the imaging device of the present invention includes an imaging element for converting an optical signal corresponding to an object to an image signal and outputting the image signal; and an imaging lens for forming an image of the object onto an imaging surface of the imaging element. The imaging lens of the present invention is used as the imaging lens.

According to the configuration of the imaging device of the present invention, by using the imaging lens of the present invention as its imaging lens, it is possible to provide a compact and high-performance imaging device, and by extension a compact and high-performance mobile product, such as a mobile phone, equipped with the imaging device.

Effects of the Invention

As described above, according to the present invention, it is possible to provide an imaging lens composed of four lenses that can be made compact (downsized, thinned), allows a reduction in cost and is compatible with a high pixel imaging element having a megapixel or more incorporated in a small mobile product such as a mobile phone and to provide an imaging device using the imaging lens.

BRIEF DESCRIPTION OF DRAWINGS

FIG. 2(a) is a spherical aberration (longitudinal chromatic aberration) graph, FIG. 2(b) is an astigmatism graph and FIG. 2(c) is a distortion graph.

FIG. 4(a) is a spherical aberration (longitudinal chromatic aberration) graph, FIG. 4(b) is an astigmatism graph and FIG. 4(c) is a distortion graph.

DESCRIPTION OF THE INVENTION

Hereinafter, the present invention will be described in more detail by way of embodiments.

Embodiment 1

Figure 1:
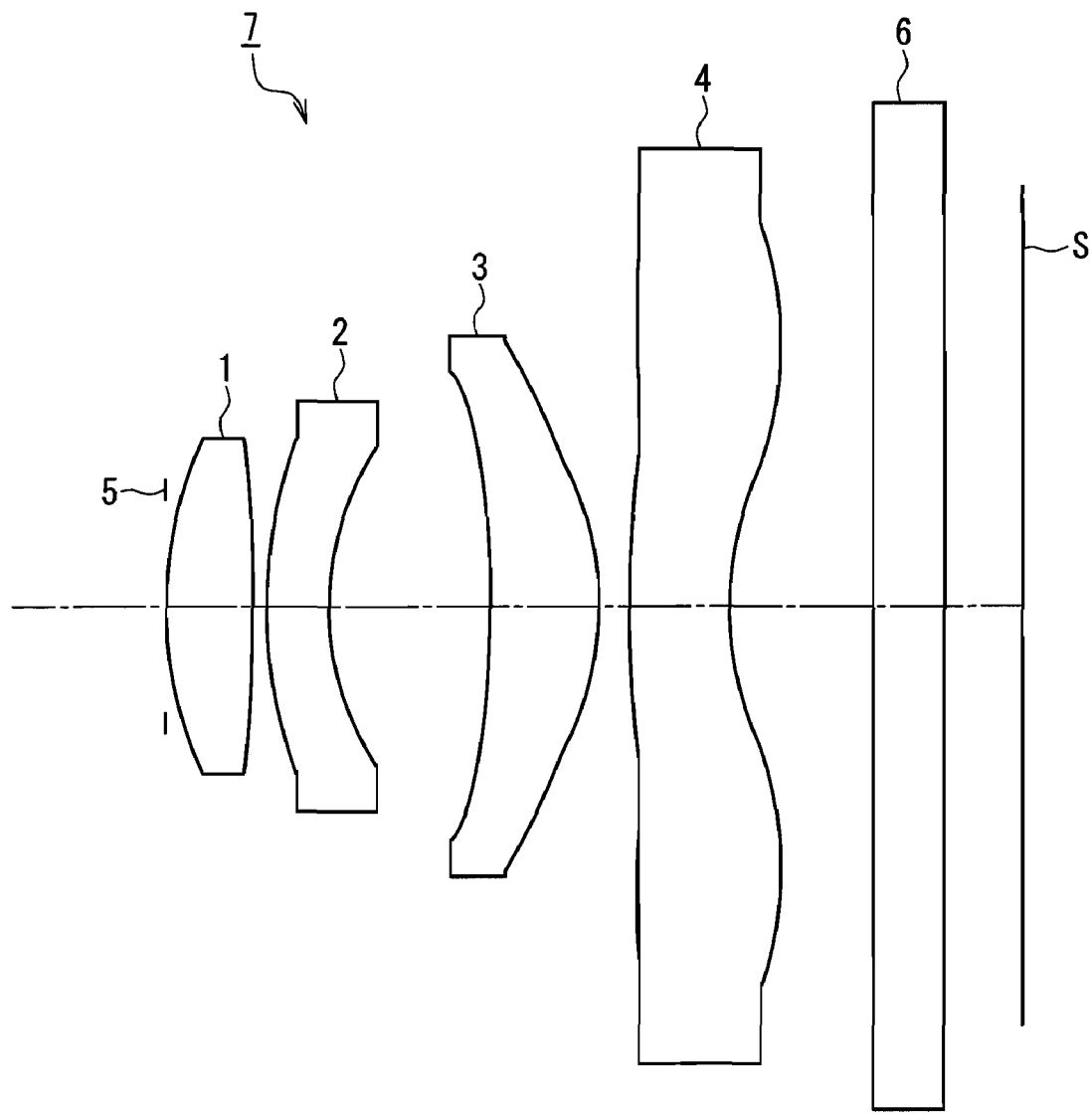
FIG. 1 schematically shows a configuration of an imaging lens according to Embodiment 1 of the present invention.

FIG. 1 schematically shows a configuration of an imaging lens according to Embodiment 1 of the present invention.

As shown in FIG. 1, an imaging lens 7 of the present embodiment includes, in order from the object side (left side of FIG. 1) to the image surface side (right side of FIG. 1); an aperture stop 5; a first lens 1 having positive power; a second lens 2 composed of a meniscus lens having negative power whose lens surface facing the image surface side is concave; a third lens 3 composed of a meniscus lens having positive power whose lens surface facing the image surface side is convex; and a fourth lens 4 having negative power whose lens surfaces are both aspherical and the lens surface facing the imaging surface side is concave in the vicinity of the optical axis. Here, the power is an amount defined by the inverse of a focal length. Further, a diffractive optical element is formed on one of the lens surfaces of the first lens 1 or one of the lens surfaces of the second lens 2. The imaging lens 7 is an imaging single focus lens for forming optical images (forming an object image) on the imaging surface S of an imaging element (e.g., CCD) and the imaging element converts an optical signal corresponding to the object to an image signal and outputs the image signal. And an imaging device is configured using the imaging element and the imaging lens 7.

The aspherical shape of the lens surfaces is given by Formula 1 (the same holds true for Embodiment 2 described later).

[Formula 1]

$$X = \frac{\frac{Y^2}{R_0}}{1 + \sqrt{1 - (\kappa + 1)\left(\frac{Y}{R_0}\right)^2}} + A4Y^4 + A6Y^6 + A8Y^8 + A10Y^{10} + \ldots$$

In Formula 1, Y denotes the height from the optical axis, X denotes the distance from the tangent plane to the vertex of the aspherical surface of the aspherical shape at the height Y from the optical axis, Ro denotes the radius of curvature of the vertex of the aspherical surface, κ denotes a conic constant, and A4, A6, A8, A10 . . . denote fourth-, sixth-, eighth-, tenth-, . . . order aspherical coefficients, respectively Further, the shape of the lens surface on which the diffractive optical element is formed (hereinafter referred to as the "diffractive optical element surface") is given, for example, by Formula 2 (the same holds true for Embodiment 2 described later).

$$\phi(\rho) = (2\pi/\lambda_0)(C2\rho^2 + C4\rho^4) \tag{Formula 2}$$

$$Y = p \times (\text{normalized radius})$$

In Formula 2, φ(ρ) denotes a phase function, Y denotes the height from the optical axis, Cn denotes an nth-order phase coefficient, and $\lambda_0$ denotes a design wavelength. Meanwhile, X is determined by shape converting $\phi(\rho)$ at an M-th diffractive order.

According to the configuration of the imaging lens 7 of the present embodiment, since a pair of meniscus lenses with lens surfaces facing each other being concave is used for the second lens 2 and the third lens 3, it is possible to lower the angles at which rays of light enter the second lens 2 and the third lenses 3 to reduce ray aberration. Further, since the diffractive optical element is formed on one of the lens surfaces of the first lens 1 or one of the lens surfaces of the second lens 2, chromatic aberration can be corrected favorably. Furthermore, since the lens surfaces of the fourth lens 4 are both aspherical, distortion and field curvature can be corrected favorably.

And for these reasons, according to the configuration of the imaging lens 7 of the present embodiment, it is possible to provide a high-performance imaging lens composed of four lenses that allows favorable correction of a variety of aberrations and is compatible with a high pixel imaging element having a megapixel or more incorporated in a small mobile product such as a mobile phone. Further, according to the configuration of the imaging lens 7 of the present embodiment, the imaging lens can be made compatible with a high pixel imaging element having a megapixel or more regardless of the material of each lens. Thus, it is possible to achieve a reduction in cost by using plastic as the lens material.

A transparent parallel plate 6 is disposed between the fourth lens 4 and the imaging surface S of the imaging element. Here, the parallel plate 6 is a plate that is equivalent to an optical low-pass filter, an IR-cut filter and a faceplate (glass cover) of the imaging element.

Respective surfaces from the lens surface of the first lens 1 facing the object side to the surface of the parallel plate 6 facing the image surface side (hereinafter also referred to as "optical surfaces") will be referred to as, in order from the object side, a "first surface", a "second surface", a "third surface", a "fourth surface" . . . an "eighth surface", a "ninth surface" and a "tenth surface" (the same folds true for Embodiment 2 described later).

Further, in the imaging lens 7 of the present embodiment, the first lens 1 is preferably a biconvex lens. In this way, by using a biconvex lens for the first lens 1, positive power can be distributed onto each lens surface. Consequently, it is possible to provide an imaging lens that causes less aberration and is easy to downsize.

Further, the imaging lens 7 of the present embodiment preferably satisfies conditional expressions (1) to (5).

$$0.8 < f1/f < 1.1 \quad (1)$$

$$-2.0 < f2/f < -1.8 \quad (2)$$

$$0.8 < f3/f < 1.2 \quad (3)$$

$$0 < f \cdot \phi_{DOE} \quad (4)$$

$$TL/f < 1.3 \quad (5)$$

where f denotes the focal length of the entire optical system, f1 denotes the focal length of the first lens 1, f2 denotes the focal length of the second lens 2, f3 denotes the focal length of the third lens 3 and $\phi_{DOE}$ denotes the power of the diffractive optical element. Further, TL denotes the total length of the optical system (optical total length), which is a distance from the lens surface of the first lens 1 facing the object side to the imaging surface S of the imaging element along the optical axis.

The conditional expression (1) relates to a balance of power between the first lens 1 and the entire optical system. When f1/f becomes 0.8 or less or 1.1 or more, it is difficult to correct coma aberration, spherical aberration and astigmatism favorably while keeping the optical total length small.

The conditional expression (2) relates to a balance of power between the second lens 2 and the entire optical system. When f2/f becomes −2.0 or less or −1.8 or more, it is difficult to correct coma aberration, spherical aberration and astigmatism favorably while keeping the optical total length small.

The conditional expression (3) relates to a balance of power between the third lens 3 and the entire optical system. When f3/f becomes 0.8 or less or 1.2 or more, it is difficult to correct coma aberration, spherical aberration and astigmatism favorably while keeping the optical total length small.

The conditional expression (4) relates to the power of the diffractive optical element formed on one of the lens surfaces of the first lens 1 or one of the lens surfaces of the second lens 2. When $f \cdot \phi_{DOE}$ becomes 0 or less, it is difficult to correct chromatic aberration favorably while keeping the optical total length small.

The conditional expression (5) is an expression for balancing the total optical length and aberrations.

That is, according to the preferred configuration described above, it is possible to provide a high-performance imaging lens composed of four lenses that can be made compact (downsized, thinned), allows favorable correction of a variety of aberrations and is compatible with a high pixel imaging element having a megapixel or more incorporated in a small mobile product, such as a mobile phone. And according to the configuration of the imaging device using the imaging lens 7 of the present embodiment, it is possible to provide a compact and high-performance imaging device, and by extension a compact and high-performance mobile product, such as a mobile phone, equipped with the imaging device.

Further, in the imaging lens 7 of the present embodiment, the first lens 1 preferably is composed of a glass lens that satisfies a conditional expression (6).

$$v1 > 60 \quad (6)$$

where v1 denotes the Abbe number of the first lens 1.

In this way, by using a glass lens for the first lens 1 having large power, it is possible to minimize deterioration in performance and a focal shift resulting from a change in temperature. Further, by satisfying the conditional expression (6), it is possible to correct aberrations favorably.

For example, existing materials, such as borosilicate glass, can be used for the material of the glass lens.

In the imaging lens 7 of the present embodiment, the lens on which the diffractive optical element is formed, the third lens 3 and the fourth lens 4 are preferably all plastic lenses.

Further, in the imaging lens 7 of the present embodiment, the first lens 1 to the fourth lens 4 are preferably all plastic lenses.

By adopting these configurations, molding of the lenses, including providing the lenses with an aspherical shape and the diffractive optical element, can be carried out readily, in addition to gaining a material cost advantage, and by extension a production cost advantage. Even when the glass lens is used for the first lens 1 as described above, it is possible to achieve a reduction in cost by utilizing plastic lenses for the second lens 2 to the fourth lens 4.

Existing materials such as polymethyl methacyrlate (PMMA), polycarbonate resin (PC), cyclic olefin polymer, styrene-based resin, polystyrene resin (PS) and low moisture absorbing acrylic resin can be used as the material of the plastic lenses.

Example 1

Hereinafter, the imaging lens of the present embodiment will be described in more detail by way of specific examples.

Table 1 provides a specific numerical example of the imaging lens in this example.

TABLE 1

| Surface number | r (mm) | d (mm) | n | ν |
|---|---|---|---|---|
| Aperture stop | ∞ | 0.00 | — | — |
| First surface | 2.193 | 0.605 | 1.4845 | 70.2 |
| Second surface | −13.501 | 0.100 | — | — |
| Third surface* | 3.053 | 0.443 | 1.607 | 27.59 |
| Fourth surface | 1.718 | 1.129 | — | — |
| Fifth surface | −5.036 | 0.758 | 1.5247 | 56.38 |
| Sixth surface | −1.551 | 0.217 | — | — |
| Seventh surface | 4.049 | 0.706 | 1.5247 | 56.38 |
| Eighth surface | 1.348 | 1.003 | — | — |
| Ninth surface | ∞ | 0.500 | 1.5168 | 64.2 |
| Tenth surface | ∞ | 0.05 | — | — |
| Image surface | ∞ | — | — | — |

In Table 1, r (mm) denotes the radius of curvature of each optical surface, d (mm) denotes the thickness or distance between each pairs of adjacent surfaces of the first lens 1 to the fourth lens 4 and the parallel plate 6 on the optical axis, n denotes the refractive index of each of the first lens 1 to the fourth lens 4 and the parallel plate 6 at the d line (587.5600 nm), and ν denotes the Abbe number of each of the first lens 1 to the fourth lens 4 and the parallel plate 6 at the d line (the same holds true for Examples 2 described later). Note that the imaging lens 7 shown in FIG. 1 is configured on the basis of the data provided in Table 1.

Further, Tables 2A and 2B provide aspherical coefficients (including conic constant) of the imaging lens in this example. In Tables 2A and 2B, it is assumed that "E+00", "E−02" and the like represent "$10^{+00}$", "$10^{-02}$" and the like, respectively (the same holds true for Table 3 and Examples 2 described later).

TABLE 2A

| | κ | A4 | A6 |
|---|---|---|---|
| First surface | −3.319419E−01 | −5.470069E−03 | −1.130280E−02 |
| Second surface | 0.000000E+00 | −1.118386E−02 | 1.500141E−02 |
| Third surface* | −3.315402E−01 | −2.738900E−02 | 1.798177E−02 |
| Fourth surface | −2.056390E+00 | 1.890851E−02 | −2.512119E−03 |
| Fifth surface | −2.269523E+01 | 1.594844E−02 | −1.873587E−02 |
| Sixth surface | −4.985820E+00 | −2.490850E−02 | 1.719791E−02 |
| Seventh surface | −2.334124E+00 | −6.798623E−02 | 1.391708E−02 |
| Eighth surface | −5.152464E+00 | −4.258969E−02 | 1.017282E−02 |

TABLE 2B

| | A8 | A10 | A12 |
|---|---|---|---|
| First surface | 1.599236E−02 | −1.465400E−02 | 0.000000E+00 |
| Second surface | 2.035062E−02 | −2.437463E−02 | 0.000000E+00 |
| Third surface* | 3.676143E−02 | −2.192744E−02 | −3.655442E−03 |
| Fourth surface | 2.069139E−02 | 1.297765E−02 | −1.466574E−02 |
| Fifth surface | 3.625334E−03 | −7.851316E−04 | 5.317961E−05 |
| Sixth surface | −1.017413E−02 | 3.596885E−03 | −5.009304E−04 |
| Seventh surface | −4.860089E−04 | −1.244998E−04 | 9.407041E−06 |
| Eighth surface | −2.003062E−03 | 2.269887E−04 | −1.077049E−05 |

As shown in Tables 2A and 2B, in the imaging lens 7 of this example, the lens surfaces of the first lens 1 to the fourth lens 4 are all aspherical. It should be noted, however, that the imaging lens 7 is not necessarily limited to this configuration as long as the lens surfaces of the fourth lens 4 are both aspherical.

Further, in Tables 1, 2A and 2B, the surface marked with an asterisk (third surface: the lens surface of the second lens 2 facing the object side) is a diffractive optical element surface. Table 3 provides a specific numerical example of the diffractive optical element surface.

TABLE 3

| Design wavelength | 546.07 nm |
|---|---|
| Diffraction order | 1 |
| Normalized radius | 1 |
| C2 | −2.507063E−03 |
| C4 | 9.305286E−07 |

As described above, in the imaging lens 7 of this example, the diffractive optical element is formed on the lens surface of the second lens 2 facing the object side. It should be noted, however, that the imaging lens 7 is not necessarily limited to this configuration. Similar effects can be achieved even when the diffractive optical element is formed on the lens surface of the first lens 1 facing the object side or the image surface side or the lens surface of the second lens 2 facing the image surface side.

Further, Table 4 provides the F number Fno, the focal length f (mm) of the entire optical system, the optical total length measured in terms of air TL (mm), the maximum image height Y' and the values of the respective conditional expressions (1) to (6) in the imaging lens 7 in this example.

TABLE 4

| Fno | 3.2 |
|---|---|
| f (mm) | 4.49 |
| TL (measured in terms of air) (mm) | 5.51 |
| Y' | 2.835 |
| Conditional expression (1) f1/f | 0.88 |
| Conditional expression (2) f2/f | −1.70 |
| Conditional expression (3) f3/f | 0.88 |
| Conditional expression (4) f4/f | −0.94 |
| Conditional expression (5) f · φDOE | 0.02 |
| Conditional expression (6) ν1 | 70.2 |

Figure 2:
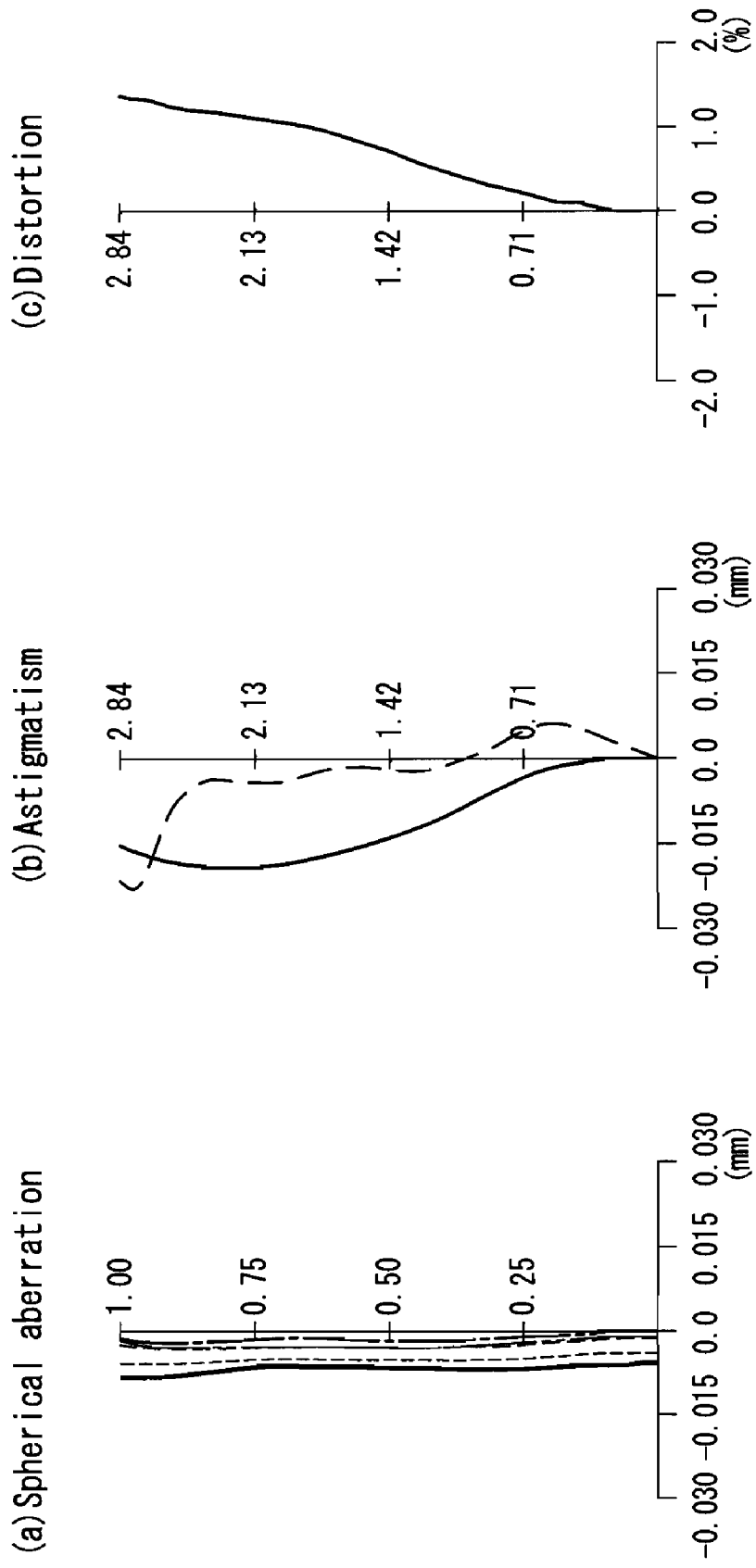
FIG. 2 shows aberration graphs of an imaging lens in Example 1 of the present invention.

FIG. 2 shows aberration graphs of the imaging lens in this example. FIG. 2(*a*) is a spherical aberration graph. A solid line indicates values at the g line (435.8300 nm), a long dashed line indicates values at the C line (656.2700 nm), a short dashed line indicates values at the F line (486.1300 rim), an alternate long and two short dashed line indicates values at the d line (587.5600 rim) and an alternate long and short dashed line indicates values at the e line (546.0700 nm). FIG. 2(*b*) is an astigmatism graph, and a solid line indicates a sagittal field curvature and a dashed line indicates a meridional field curvature. FIG. 2(*c*) is a distortion graph. A longitudinal chromatic aberration graph is the same as the spherical aberration graph of FIG. 2(*a*).

As can be seen from the aberration graphs shown in FIG. 2, the imaging lens 7 in this example allows favorable correction of a variety of aberrations, meaning that it is compatible with a high pixel imaging element having a megapixel or more. Additionally, in view of the results provided in Table 4, it is evident that a high-performance imaging lens composed of four lens, which can be made compact (downsized, thinned), allows favorable correction of a variety of aberrations and is compatible with a high pixel imaging element having a megapixel or more incorporated in a small mobile product such as a mobile phone, has been obtained.

Embodiment 2

Figure 3:
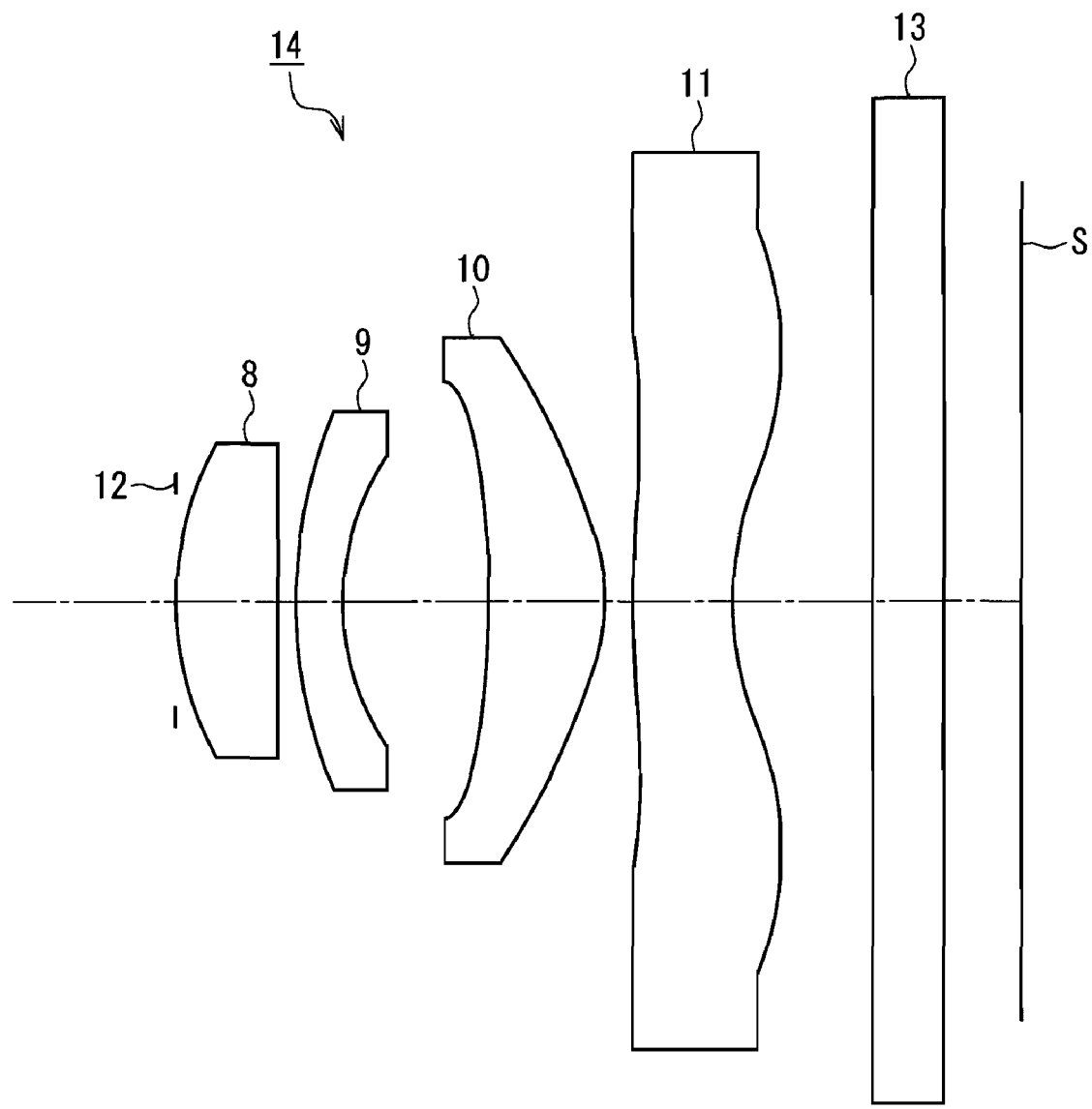
FIG. 3 schematically shows a configuration of an imaging lens according to Embodiment 2 of the present invention.

FIG. 3 schematically shows a configuration of an imaging lens according to Embodiment 2 of the present invention.

As shown in FIG. 3, an imaging lens 14 of the present embodiment includes, in order from the object side (left side of FIG. 3) to the image surface side (right side of FIG. 3): an aperture stop 12; a first lens 8 having positive power; a second lens 9 composed of a meniscus lens having negative power whose lens surface facing the image surface side is concave; a third lens 10 composed of a meniscus lens having positive power whose lens surface facing the image surface side is convex; and a fourth lens 11 having negative power whose lens surfaces are both aspherical and lens surface facing the image surface side is concave in the vicinity of the optical axis. Further, a diffractive optical element is formed on one of the lens surfaces of the first lens 8 or one of the lens surfaces of the second lens 9.

A transparent parallel plate 13 similar to the parallel plate 6 in Embodiment 1 is disposed between the fourth lens 11 and the imaging surface S of the imaging element.

Also in the imaging lens 14 of the present embodiment, the first lens 8 is preferably a biconvex lens.

Further, the imaging lens 14 of the present embodiment also preferably satisfies the conditional expressions (1) to (5).

Further, also in the imaging lens 14 of the present embodiment, the first lens 8 preferably is composed of a glass lens that satisfies the conditional expression (6).

Further, also in the imaging lens 14 of the present embodiment, the lens on which the diffractive optical element is formed, the third lens 10 and the fourth lens 11 are preferably all plastic lenses.

Further, also in the imaging lens 14 of the present embodiment, the first lens 8 to the fourth lens 11 are preferably all plastic lenses.

And effects similar to those achieved by the configuration of the imaging lens 7 of Embodiment 1 can also be achieved by the configuration of the imaging lens 14 of the present embodiment.

Example 2

Hereinafter, the imaging lens of the present embodiment will be described in more detail by way of specific examples.

Table 5 provides a specific numerical example of the imaging lens in this example. The imaging lens 14 shown in FIG. 3 is configured on the basis of the data provided in Table 5.

TABLE 5

| Surface number | r (mm) | d (mm) | n | ν |
|---|---|---|---|---|
| Aperture stop | ∞ | 0.00 | — | — |
| First surface | 2.077 | 0.706 | 1.4956 | 80.8 |
| Second surface | −33.726 | 0.120 | — | — |
| Third surface* | 2.889 | 0.356 | 1.607 | 27.59 |
| Fourth surface | 1.750 | 1.040 | — | — |
| Fifth surface | −4.358 | 0.813 | 1.5247 | 56.38 |
| Sixth surface | −1.462 | 0.217 | — | — |
| Seventh surface | 4.937 | 0.714 | 1.5247 | 56.38 |
| Eighth surface | 1.359 | 0.995 | — | — |
| Ninth surface | ∞ | 0.500 | 1.5168 | 64.2 |
| Tenth surface | ∞ | 0.05 | — | — |
| Image surface | ∞ | — | — | — |

Further, Tables 6A and 6B provide aspherical coefficients (including conic constant) of the imaging lens in this example.

TABLE 6A

| | κ | A4 | A6 |
|---|---|---|---|
| First surface | −1.525910E−01 | −2.513891E−03 | −5.653254E−03 |
| Second surface | 0.000000E+00 | −3.066810E−03 | 2.810490E−02 |
| Third surface* | −1.206798E−01 | −2.635914E−02 | 1.559526E−02 |
| Fourth surface | −1.982053E+00 | 1.883566E−02 | −3.487214E−03 |
| Fifth surface | −1.189536E+01 | 1.410384E−02 | −1.893160E−02 |
| Sixth surface | −4.464072E+00 | −2.913298E−02 | 1.911723E−02 |
| Seventh surface | 0.000000E+00 | −6.826297E−02 | 1.402331E−02 |
| Eighth surface | −5.490042E+00 | −4.184835E−02 | 9.789779E−03 |

TABLE 6B

| | A8 | A10 | A12 |
|---|---|---|---|
| First surface | 1.398315E−02 | −1.438008E−02 | 0.000000E+00 |
| Second surface | −1.148893E−02 | 0.000000E+00 | 0.000000E+00 |
| Third surface* | 3.551204E−02 | −2.325284E−02 | 0.000000E+00 |
| Fourth surface | 2.418121E−02 | 1.042590E−02 | −1.306273E−02 |
| Fifth surface | 4.129449E−03 | −1.367575E−03 | 0.000000E+00 |
| Sixth surface | −9.939270E−03 | 3.577020E−03 | −5.695718E−04 |
| Seventh surface | −5.465179E−04 | −1.254191E−04 | 9.432261E−06 |
| Eighth surface | −1.931854E−03 | 2.214632E−04 | −1.075557E−05 |

As shown in Tables 6A and 6B, in the imaging lens 14 in this example, the lens surfaces of the first lens 8 to the fourth lens 11 are all aspherical. It should be noted, however, that the imaging lens 14 is not necessarily limited to this configuration as long as the lens surfaces of the fourth lens 11 are both aspherical.

In Tables 5, 6A and 6B, the surface marked with an asterisk (third surface: the lens surface of the second lens 9 facing the object side) is a diffractive optical element surface. Table 7 provides a specific numerical example of the diffractive optical element surface.

TABLE 7

| Design wavelength | 546.07 nm |
|---|---|
| Diffraction order | 1 |
| Normalized radius | 1 |
| C2 | −1.893026E−03 |
| C4 | 3.476601E−05 |

As described above, in the imaging lens 14 of this example, the diffractive optical element is formed on the lens surface of the second lens 9 facing the object side. It should be noted, however, that the imaging lens 14 is not necessarily limited to this configuration. Similar effects can be obtained even when the diffractive optical element is formed on the lens surface of the first lens 8 facing the object side or the image surface side or the lens surface of the second lens 9 facing the image surface side.

Further, Table 8 provides the F number Fno, the focal length f (mm) of the entire optical system, the optical total length measured in terms of air TL (mm), the maximum image height Y' and the values of the respective conditional expressions (1) to (6) in the imaging lens 14 in this example.

TABLE 8

| Fno | 2.8 |
|---|---|
| f (mm) | 4.5 |
| TL (measured in terms of air) (mm) | 5.51 |
| Y' | 2.835 |
| Conditional expression (1) f1/f | 0.88 |
| Conditional expression (2) f2/f | −1.89 |
| Conditional expression (3) f3/f | 0.85 |
| Conditional expression (4) f4/f | −0.85 |
| Conditional expression (5) f · φDOE | 0.02 |
| Conditional expression (6) ν1 | 80.8 |

Figure 4:
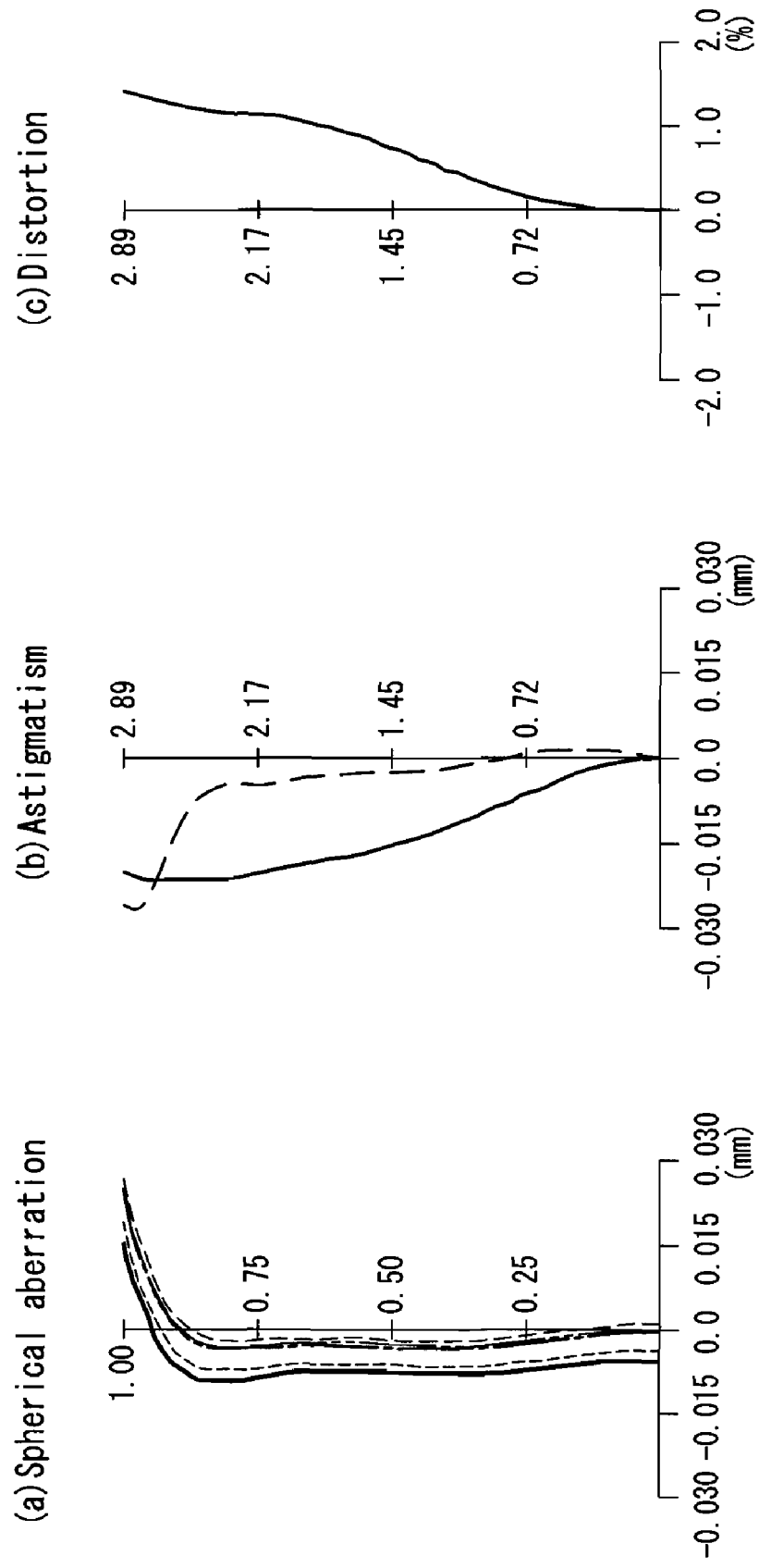
FIG. 4 shows aberration graphs of an imaging lens in Example 2 of the present invention.

FIG. 4 shows aberration graphs of the imaging lens in this example. FIG. 4(a) is a spherical aberration graph. A solid line indicates values at the g line, a short dashed line indicates values at the F line, an alternate long and short dashed line indicates values at the e line, an alternate long and two short dashed line indicates values at the d line, and a long dashed line indicates values at the C line. FIG. 4(b) is an astigmatism graph, and a solid line indicates a sagittal field curvature and a dashed line indicates a meridional field curvature. FIG. 4(c) is a distortion graph. A longitudinal chromatic aberration graph is the same as the spherical aberration graph of FIG. 4(a).

As can be seen from the aberration graphs shown in FIG. 4, the imaging lens 14 in this example allows favorable correction of a variety of aberrations, meaning that it is compatible with a high pixel imaging element having a megapixel or more. Additionally, in view of the results provided in Table 8, it is evident that a high-performance imaging lens composed of four lens, which can be made compact (downsized, thinned), allows favorable correction of a variety of aberrations and is compatible with a high pixel imaging element having a megapixel or more incorporated in a small mobile product such as a mobile phone, has been obtained.

INDUSTRIAL APPLICABILITY

Since the imaging lens of the present invention can be made compact (downsized, thinned), allows a reduction in cost and can be made compatible with a high pixel imaging element having a megapixel or more, it is particularly useful in the field of small mobile products, such as a mobile phone, equipped with an imagining element for which an increase in the number of pixels is desired.

DESCRIPTION OF REFERENCE NUMERALS 1, 8 first lens
2, 9 second lens
3, 10 third lens
4, 11 fourth lens
5, 12 aperture stop
6, 13 parallel plate
7, 14 imaging lens
S imaging surface

The invention claimed is:

1. An imaging lens comprising, in order from an object side to an image surface side:
    a first lens having positive power;
    a second lens composed of a meniscus lens having negative power whose lens surface facing the image surface side is concave;
    a third lens composed of a meniscus lens having positive power whose lens surface facing the image surface side is convex, and
    a fourth lens having negative power whose lens surfaces are both aspheric and lens surface facing the image surface side is concave in the vicinity of an optical axis,
    wherein a diffractive optical element is formed on one of the lens surfaces of the first lens or one of the lens surfaces of the second lens,
    wherein the first lens is a biconvex lens, and
    wherein when f denotes a focal length of an entire optical system, f1 denotes a focal length of the first lens, f2 denotes a focal length of the second lens, f3 denotes a focal length of the third lens, $\phi_{DOE}$ denotes power of the diffractive optical element and TL denotes a total length of the optical system, conditional expressions (1) to (5) are satisfied:

$$0.8 < f1/f < 1.1 \tag{1}$$

$$-2.0 < f2/f < -1.8 \tag{2}$$

$$0.8 < f3/f < 1.2 \tag{3}$$

$$0 < f \cdot \phi_{DOE} \tag{4}$$

$$TL/f < 1.3 \tag{5}.$$

2. The imaging lens according to claim 1, wherein when v1 denotes an Abbe number of the first lens, the first lens is composed of a glass lens that satisfies a conditional expression (6):

$$\sigma 1 > 60 \ldots (6).$$

3. The imaging lens according to claim 1, wherein the lens on which the diffractive optical element is formed and the third and fourth lenses are all plastic lenses.

4. The imaging lens according claim 1, wherein the first to fourth lenses are all plastic lenses.

5. An imaging device comprising:
    an imaging element for converting an optical signal corresponding to an object to an image signal and outputting the image signal; and
    an imaging lens for forming an image of the object onto an imaging surface of the imaging element,
    wherein the imaging lens according to claim 1 is used as the imaging lens.

* * * * *